(12) United States Patent
Zatorski et al.

(10) Patent No.: US 11,618,580 B2
(45) Date of Patent: Apr. 4, 2023

(54) HYBRID ELECTRIC AIRCRAFT ENGINE

(71) Applicant: General Electric Company, Schenectady, NY (US)

(72) Inventors: Darek Tomasz Zatorski, Fort Wright, KY (US); Craig William Higgins, Liberty Township, OH (US)

(73) Assignee: General Electric Company, Schenectady, NY (US)

(*) Notice: Subject to any disclaimer, the term of this patent is extended or adjusted under 35 U.S.C. 154(b) by 104 days.

(21) Appl. No.: 17/162,158

(22) Filed: Jan. 29, 2021

(65) Prior Publication Data

US 2022/0063825 A1 Mar. 3, 2022

Related U.S. Application Data

(60) Provisional application No. 63/072,542, filed on Aug. 31, 2020.

(51) Int. Cl.
| | | |
|---|---|---|
| B64D 31/06 | (2006.01) | |
| B64D 27/02 | (2006.01) | |
| B64D 27/10 | (2006.01) | |
| B64D 27/24 | (2006.01) | |
| F02C 6/20 | (2006.01) | |
| F02C 9/00 | (2006.01) | |
| G07C 5/02 | (2006.01) | |

(52) U.S. Cl.
CPC ............ *B64D 31/06* (2013.01); *B64D 27/02* (2013.01); *B64D 27/10* (2013.01); *B64D 27/24* (2013.01); *F02C 6/206* (2013.01); *F02C 9/00* (2013.01); *G07C 5/02* (2013.01); *B64D 2027/026* (2013.01); *F05D 2220/323* (2013.01); *F05D 2220/70* (2013.01); *F05D 2270/091* (2013.01)

(58) Field of Classification Search
None
See application file for complete search history.

(56) References Cited

U.S. PATENT DOCUMENTS

| | | | |
|---|---|---|---|
| 7,758,301 B2 | 7/2010 | Bilson et al. | |
| 7,861,533 B2 * | 1/2011 | Dooley | F02C 7/32 60/778 |
| 10,006,375 B1 * | 6/2018 | Wagner | H02P 9/08 |
| 10,180,080 B2 * | 1/2019 | Munevar | F02C 7/36 |
| 10,583,931 B2 * | 3/2020 | Cline | F02C 6/14 |
| 11,035,300 B2 * | 6/2021 | Smith | F02C 9/00 |
| 11,230,385 B2 | 1/2022 | Adibhatla et al. | |

(Continued)

FOREIGN PATENT DOCUMENTS

| | | |
|---|---|---|
| EP | 2201666 A2 | 6/2010 |
| GB | 2046848 A | 11/1980 |
| WO | WO2020/008147 A1 | 1/2020 |

*Primary Examiner* — Jason H Duger
(74) *Attorney, Agent, or Firm* — Dority & Manning, P.A.

(57) ABSTRACT

A method for operating a hybrid electric propulsion system of an aircraft, the hybrid electric propulsion system comprising a turbomachine, an electric machine coupled to the turbomachine, and a propulsor coupled to the turbomachine, the method comprising: operating the turbomachine to drive the propulsor; receiving data indicative of a failure condition of the hybrid electric propulsion system; and extracting power from the turbomachine using the electric machine to slow down one or more rotating components of the turbomachine in response to receiving the data indicative of the failure condition.

17 Claims, 2 Drawing Sheets

(56) References Cited

U.S. PATENT DOCUMENTS

| | | | |
|---|---|---|---|
| 2007/0160457 A1 | 7/2007 | Bilson et al. | |
| 2008/0279675 A1* | 11/2008 | Ullyott | F02C 9/46 |
| | | | 701/100 |
| 2012/0025032 A1 | 2/2012 | Hopdjanian et al. | |
| 2016/0010567 A1* | 1/2016 | Cline | F02C 7/32 |
| | | | 60/722 |
| 2018/0370641 A1 | 12/2018 | Dindar et al. | |
| 2019/0322379 A1 | 10/2019 | Mackin | |
| 2019/0344898 A1* | 11/2019 | Scothern | B64C 21/06 |
| 2020/0062414 A1 | 2/2020 | Hon et al. | |
| 2020/0079513 A1* | 3/2020 | Pastouchenko | B64D 27/02 |

* cited by examiner

HYBRID ELECTRIC AIRCRAFT ENGINE

CROSS-REFERENCE TO RELATED APPLICATION

This application is a non-provisional application claiming the benefit of priority under 35 U.S.C. § 119(e) to U.S. Provisional Application No. 63/072,542, filed Aug. 31, 2020, which is hereby incorporated by reference in its entirety.

FIELD

The present subject matter relates generally to a hybrid electric propulsion engine for the aircraft, and a method for operating the hybrid electric propulsion engine to reduce a risk of damage during a failure condition.

BACKGROUND

Certain aircraft generally include gas turbine engines to provide propulsion for the aircraft. A turbomachine of such a gas turbine engine may include a high pressure system, or core, in addition to a low pressure system. Depending on the type of gas turbine engine, a low pressure shaft of the low pressure system may be mechanically coupled to, e.g., a fan or propeller.

During a failure event of the engine, the low pressure system and high pressure system of the gas turbine engine may exceed desired thresholds. In order to ensure, e.g., the low pressure system does not fail in such a failure condition, the low pressure system is designed to accept carryover energy from the core, and more particularly, a turbine of the low pressure system is designed to be able to rotate at higher rotational speeds than would otherwise be necessary. However, such may lead to a relatively heavy, large, and expensive low pressure system, or more particularly, a relatively large bore within the turbine of the low pressure system. A gas turbine engine capable of addressing these issues in an improved manner would therefore be welcomed.

BRIEF DESCRIPTION

Aspects and advantages of the invention will be set forth in part in the following description, or may be obvious from the description, or may be learned through practice of the invention.

In one exemplary aspect of the present disclosure, a method is provided for operating a hybrid electric propulsion system of an aircraft, the hybrid electric propulsion system including a turbomachine, an electric machine coupled to the turbomachine, and a propulsor coupled to the turbomachine. The method includes operating the turbomachine to drive the propulsor; receiving data indicative of a failure condition of the hybrid electric propulsion system; and extracting power from the turbomachine using the electric machine to slow down one or more rotating components of the turbomachine in response to receiving the data indicative of the failure condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a hybrid electric propulsion system and a method for operating the same in order to prevent or minimize a risk of over-speeding a low pressure turbine of a gas turbine engine in the event of a failure condition of the hybrid electric propulsion system. The hybrid electric propulsion system generally includes the gas turbine engine, an electric machine coupled to the gas turbine engine, and a propulsor also coupled to the gas turbine engine. For example, in certain exemplary aspects, the hybrid electric propulsion system may be incorporated into, e.g., an aircraft and the gas turbine engine and propulsor may be, e.g., a turbofan engine. The electric machine may be coupled to a low pressure system of the gas turbine engine. In the event of a failure condition, such as a loss of load condition, the electric machine may be utilized to extract power from the low pressure system, acting as a drag on the low pressure system, to reduce an amount of energy within the low pressure system of the turboshaft engine.

Depending on the type and/or extent of the failure, the electric machine may extract a maximum amount of power, or alternatively may extract less than a maximum amount of power.

Figure 1:
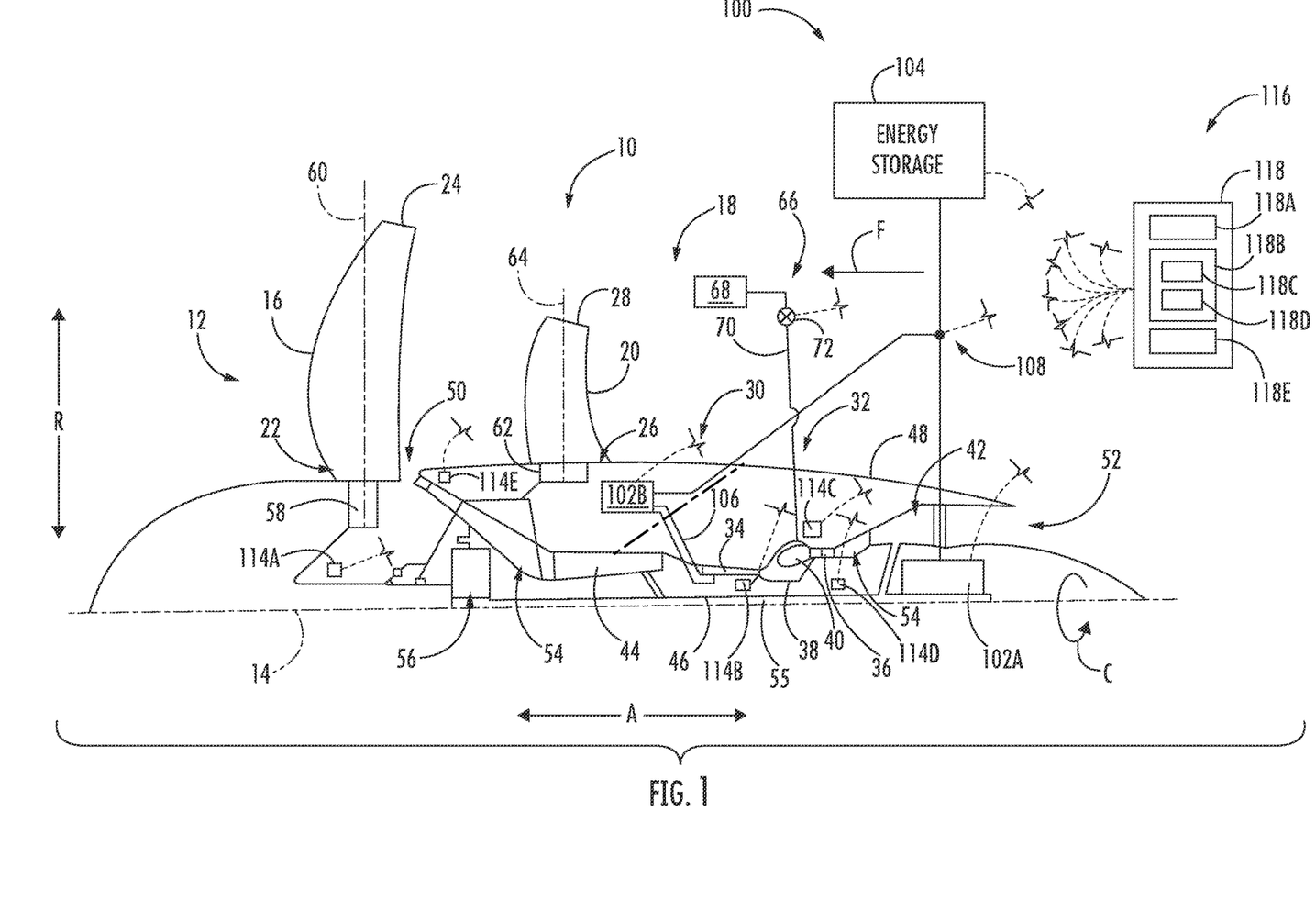
FIG. 1 is a schematic, cross-sectional view of a gas turbine engine incorporated into a hybrid electric propulsion system in accordance with an exemplary embodiment of the present disclosure.

Referring now to FIG. 1, a cross-sectional view of an exemplary embodiment of a gas turbine engine as may incorporate one or more inventive aspects of the present disclosure is provided. In particular, the exemplary gas turbine engine of FIG. 1 is a configured as a single unducted rotor engine 10 defining an axial direction A, a radial direction R, and a circumferential direction C. As is seen from FIG. 1, the engine 10 takes the form of an open rotor propulsion system and has a rotor assembly 12 which includes an array of airfoils arranged around a central longitudinal axis 14 of engine 10, and more particularly includes an array of rotor blades 16 arranged around the central longitudinal axis 14 of engine 10. Moreover, as will be explained in more detail below, the engine 10 additionally includes a non-rotating vane assembly 18 positioned aft of the rotor assembly 12 (i.e., non-rotating with respect to the central axis 14), which includes an array of airfoils also disposed around central axis 14, and more particularly includes an array of vanes 20 disposed around central axis 14. The rotor blades 16 are arranged in typically equally spaced relation around the centerline 14, and each blade has a root 22 and a tip 24 and a span defined therebetween. Similarly, the vanes 20 are also arranged in typically equally spaced relation around the centerline 14, and each has a root 26 and a tip 28 and a span defined therebetween. The rotor assembly 12 further includes a hub 44 located forward of the plurality of rotor blades 16.

Additionally, the engine 10 includes a turbomachine 30 having core (or high pressure/high speed system) 32 and a low pressure/low speed system. It will be appreciated that as used herein, the terms "speed" and "pressure" are used with respect to the high pressure/high speed system and low pressure/low speed system interchangeably. Further, it will be appreciated that the terms "high" and "low" are used in this same context to distinguish between the two systems, and are not meant to imply any absolute speed and/or pressure values.

The core 32 generally includes a high-speed compressor 34, a high speed turbine 36, and a high speed shaft 38 extending therebetween and connecting the high speed compressor 34 and high speed turbine 36. The high speed compressor 34, the high speed turbine 36, and the high speed shaft 38 may collectively be referred to as a high speed spool of the engine. Further, a combustion section 40 is located between the high speed compressor 34 and high speed turbine 36. The combustion section 40 may include one or more configurations for receiving a mixture of fuel and air, and providing a flow of combustion gasses through the high speed turbine 36 for driving the high speed spool.

Moreover, for the exemplary engine 10 depicted, the aircraft and/or engine 10 includes a fuel delivery system 66. The fuel delivery system 66 generally includes a fuel source 68 (which may be, e.g., a fuel tank of an aircraft including the engine 10), one or more fuel lines 70 extending between the fuel source 68 and the combustion section 40 of the engine 10, and a fuel valve 72. The fuel valve 72 is in fluid communication with the one or more fuel lines 70, configured to regulate a fuel flow through the one or more fuel lines 70 from the fuel source 68 to the combustion section 40. The fuel valve 72 may be referred to as a fuel metering unit ("FMU"), and may generally control a power output of the engine 10.

Referring still to FIG. 1, the low speed system additionally includes a low speed turbine 42, a low speed compressor or booster 44, and a low speed shaft 46 extending between and connecting the low speed compressor 44 and low speed turbine 42. The low speed compressor 44, the low speed turbine 42, and the low speed shaft 46 may collectively be referred to as a low speed spool 55 of the engine.

Although the engine 10 is depicted with the low speed compressor 44 positioned forward of the high speed compressor 34, in certain embodiments the compressors 34, 44 may be in an interdigitated arrangement. Additionally, or alternatively, although the engine 10 is depicted with the high speed turbine 36 positioned forward of the low speed turbine 42, in certain embodiments the turbines 36, 42 may similarly be in an interdigitated arrangement.

Referring still to FIG. 1, the turbomachine 30 is generally encased in a cowl 48. Moreover, it will be appreciated that the cowl 48 defines at least in part an inlet 50 and an exhaust 52, and includes a turbomachinery flowpath 54 extending between the inlet 50 and the exhaust 52. The inlet 50 is for the embodiment shown an annular or axisymmetric 360 degree inlet 50 located between the rotor blade assembly 12 and the fixed or stationary vane assembly 18, and provides a path for incoming atmospheric air to enter the turbomachinery flowpath 54 (and compressors 44, 34, combustion section 40, and turbines 36, 42) inwardly of the guide vanes 28 along the radial direction R. Such a location may be advantageous for a variety of reasons, including management of icing performance as well as protecting the inlet 50 from various objects and materials as may be encountered in operation.

However, in other embodiments, the inlet 50 may be positioned at any other suitable location, e.g., aft of the vane assembly 18, arranged in a non-axisymmetric manner, etc.

Further, as is depicted schematically by a phantom line in FIG. 1, the engine 10 may includes a duct extending from the compressor section to an outlet in the cowl 48. The duct may extend from the either compressor 44, 34, or from a location between compressors 44, 34.

As is depicted, the rotor assembly 12 is driven by the turbomachine 30, and more specifically, is driven by the low speed spool 55. More specifically, still, engine 10 in the embodiment shown in FIG. 1 includes a power gearbox 56, and the rotor assembly 12 is driven by the low speed spool 55 of the turbomachine 30 across the power gearbox 56. In such a manner, the rotating rotor blades 16 of the rotor assembly 12 may rotate around the axis 14 and generate thrust to propel engine 10, and hence an aircraft to which it is associated, in a forward direction F. For example, in certain embodiments, one or more engines configured in a manner similar to the exemplary engine 10 depicted in FIG. 1 may be incorporated in and utilized with the aircraft of FIGS. 1, 4, and/or 5.

The power gearbox 56 may include a gearset for decreasing a rotational speed of the low speed spool 55 relative to the low speed turbine 42, such that the rotor assembly 12 may rotate at a slower rotational speed than the low speed spool 55.

As briefly mentioned above the engine 10 includes a vane assembly 18. The vane assembly 18 extends from the cowl 48 and is positioned aft of the rotor assembly 12. The vanes 20 of the vane assembly 18 may be mounted to a stationary frame or other mounting structure and do not rotate relative to the central axis 14. For reference purposes, FIG. 1 also depicts the forward direction with arrow F, which in turn defines the forward and aft portions of the system. As shown in FIG. 1, the rotor assembly 12 is located forward of the turbomachine 30 in a "puller" configuration, and the exhaust 52 is located aft of the guide vanes 28. As will be appreciated, the vanes 20 of the vane assembly 18 may be configured for straightening out an airflow (e.g., reducing a swirl in the airflow) from the rotor assembly 12 to increase an efficiency of the engine 10. For example, the vanes 20 may be sized, shaped, and configured to impart a counteracting swirl to the airflow from the rotor blades 16 so that in a downstream direction aft of both rows of airfoils (e.g., blades 16, vanes 20) the airflow has a greatly reduced degree of swirl, which may translate to an increased level of induced efficiency.

Referring still to FIG. 1, it may be desirable that the rotor blades 16, the vanes 20, or both, incorporate a pitch change mechanism such that the airfoils (e.g., blades 16, vanes 20, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the rotor blades 16, or to provide a thrust reversing feature which may be useful in certain operating conditions such as upon landing an aircraft, or to desirably adjust acoustic noise produced at least in part by the rotor blades 16, the vanes 20, or aerodynamic interactions from the rotor blades 16 relative to the vanes 20. More specifically, for the embodiment of FIG. 1, the rotor assembly 12 is depicted with a pitch change mechanism 58 for rotating the rotor blades 16 about their respective pitch axes 60, and the vane assembly 18 is depicted with a pitch change mechanism 62 for rotating the vanes 20 about their respective pitch axes 64.

It will be appreciated, however, that the exemplary single rotor unducted engine 10 depicted in FIG. 1 is by way of example only, and that in other exemplary embodiments, the engine 10 may have any other suitable configuration, including, for example, any other suitable number of shafts or spools, turbines, compressors, etc.; fixed-pitch blades 16, 20, or both; a direct-drive configuration (i.e., may not include the gearbox 56); etc. Additionally, or alternatively, in other exemplary embodiments, any other suitable gas turbine engine may be provided. For example, in other exemplary embodiments, the gas turbine engine may be a ducted turbofan engine, a turboshaft engine, a turboprop engine, a turbojet engine, etc. Moreover, although the engine 10 is depicted as a single unducted rotor engine, in other embodiments, the engine may include a multi-stage open rotor configuration, and aspects of the disclosure described hereinbelow may be incorporated therein.

Referring still to FIG. 1, it will further be appreciated that the engine 10 is integrated with an electric power system 100 of the hybrid electric propulsion system. The electric power system 100 generally includes an electric machine 102 coupled to at least one of the high pressure system (or core 32) or the low pressure system, an energy storage unit 104, and an electric power bus 108 electrically connecting the various components of electric power system 100. The electric power bus 108 may be, e.g., one or more electrical lines arranged in any suitable configuration.

Although not shown, the electric power bus 108 may further connect the various components of the electric power system 100 to external electric power sources (e.g., other engines having electric machines, additional power storage units, an auxiliary power unit, etc.) and/or additional power sinks (e.g., other engines having electric machines, aircraft loads, accessory engine system, a power resistor bank, additional power storage units, etc.).

Further, still, for the embodiment shown, the electric machine 102 of the electric power system 100 is an LP electric machine 102A coupled to the low pressure system of the engine 10. More specifically, for the embodiment shown, the LP electric machine 102A is embedded within the engine 10, at a location within or aft of the turbine section of the engine 10, and inward of the core airflow path 54 through the engine 10 along the radial direction R. Such a configuration may assist with reducing a rotational speed of the low pressure system during a sheer event of the low pressure shaft 46, as will be appreciated from the description below.

It will be appreciated, however, that in other example embodiments, the LP electric machine 102A may additionally, or alternatively, be configured in any other suitable manner. For example, in other embodiments, the LP electric machine 102A may be embedded within a compressor section of the engine 10, may be located outward of the core airflow path 54 along the radial direction R (and, e.g., within the cowl 48), etc.

Moreover, for the embodiment shown, the LP electric machine 102A is not the only electric machine 102 of the electric power system 100. More specifically, the electric power system 100 further includes an HP electric machine 102B coupled to the high-pressure system/core of the engine 10, and in electrical communication with the electric power bus 108. The HP electric machine 102B is, for the embodiment shown, positioned at a location outward of the core airflow path 54 along the radial direction R, driven through a geared connection 106. For example, in certain embodiments the HP electric machine 102B may be coupled to an accessory gearbox (not shown), which is in turn coupled to the high-pressure system of the engine 10. Additionally, for the embodiment shown, the HP electric machine 102B is located proximate the compressor section of the engine 10. It will be appreciated that in other embodiments, the HP electric machine 102B may alternatively be positioned inward of the core airflow path 54 along the radial direction R, within the compressor section or within the turbine section.

Moreover, the LP and HP electric machines 102A, 102B may be relatively powerful electric machines. For example, in certain exemplary embodiments, the LP and HP electric machines 102A, 102B may each define a maximum power extraction capacity (i.e., the maximum amount of power that the respective electric machine can generate) of at least about twenty kilowatts of electrical power. For example, in certain exemplary embodiments, the LP and HP electric machines 102A, 102B may define a maximum power extraction capacity of at least about fifty kilowatts of electrical power, such as at least about one hundred kilowatts of electrical power, such as up to about one thousand kilowatts of electrical power. In such a manner, the LP and HP electric machines 102A, 102B may be capable of extracting a relatively large amount of energy from the engine 10, and/or may be capable of providing a large amount of energy to the engine 10.

It will be appreciated, however, that in other embodiments, one of the LP and HP electric machines 102A, 102B may define a greater maximum power extraction capacity than the other. For example, in certain exemplary embodiments, the LP electric machine 102A may define a maximum power extraction capacity at least about 10% greater than the HP electric machine 102B, such as at least about 15% greater, such as at least about 25% greater, such as at least about 50% greater, such as up to 1000% greater. In such a manner, when the engine is operated in accordance with one or more of the exemplary aspects of the method 200, described below, the engine 10 may be capable of extracting a larger amount of energy from the low pressure system (which may be coupled to the rotor assembly 12 absent a shaft failure).

Referring still to FIG. 1, in at least certain exemplary embodiments, the energy storage unit 104 may include one or more batteries or battery packs. Additionally, or alternatively, the energy storage unit 104 may include one or more supercapacitor arrays, one or more ultracapacitor arrays, or both.

In at least certain embodiments, the energy storage unit 104 may be configured to hold at least about twenty kilowatt-hours of electrical power. For example, in certain exemplary embodiments, the energy storage unit 104 may be configured to store at least about thirty kilowatt-hours of electrical power, such as at least about fifty kilowatt-hours of electrical power, such as at least about sixty kilowatt-hours of electrical power, such as up to about one thousand kilowatts hours of electrical power. In such a manner, when the engine is operated in accordance with one or more of the exemplary aspects of the method 200, described below, the energy storage unit 104 may be capable of accepting a relatively large amount of energy from the engine 10, for an extended period of time.

It will be appreciated, however, that the exemplary electric power system 100 described herein is by way of example only. In other exemplary embodiments, the electric power system 100 may not include both the LP and HP electric machines 102A, 102B, and instead may only include one of the LP and HP electric machines 102A, 102B. Additionally, or alternatively, the electric power system 100 may have any other suitable power sink.

As will be discussed in more detail below with reference to FIG. 2, the exemplary electric power system 100 depicted in FIG. 1 may be used as an overspeed protection system for the engine 10. For example, in the event of a failure condition of the hybrid electric propulsion system, such as of the exemplary engine 10 depicted, the electric power system 100 may be utilized to slow down the low pressure system, and more specifically, the low pressure turbine 42 of the low pressure system, by operating the LP electric machine 102A as an electric generator, extracting power from the low pressure system. In such a manner, the electric power system 100 may assist with preventing the low pressure turbine 42 from rotating at speeds in excess of an upper rotational speed limit for the low pressure turbine 42. The upper rotational speed limit for the low pressure turbine 42 may be, e.g., a rotor disk burst speed.

Further, by utilizing such a system the low pressure turbine 42 may be designed to withstand a lower rotational speed than it otherwise would need to, as the LP electric machine 102A may prevent the low pressure turbine 42 from reaching the higher terminal speeds. Such may therefore allow for the low pressure turbine 42, such as the rotor disks and bores of the low pressure turbine 42, to be designed smaller and more lightweight, resulting in a lighter and less expensive engine.

In addition, given that the exemplary electric power system includes an HP electric machine 102B coupled to the high-pressure system, the electric power system 100 may further assist with slowing down the high-pressure system, by similarly extracting power from the high-pressure system using the HP electric machine 102B. Such may reduce an amount of energy that the low pressure turbine 42 must absorb during certain failure conditions, allowing for an even further reduction in the size of certain components of the low pressure turbine 42.

Depending on where the failure is, the system may or may not immediately reduce a fuel flow to the combustion section 40. For example, if the failure is within the high pressure system (such as, for example, a high pressure variable guide vane, a fuel valve, etc.), fuel flow may be immediately reduced to prevent or reduce the high pressure system from accelerating more quickly than the low pressure system. By contrast, however, if the failure is within the low pressure system (such as, for example, a low pressure shaft sheer), then the low pressure system may accelerate faster than the high pressure system (potentially creating an undesirably high rotational speed condition in the low pressure system), and power may be added to the high pressure system (e.g., through additional fuel flow, added power to the electric machine 102B, etc.), to increase a speed of the high pressure system to trigger an overspeed condition for the engine.

Referring still to FIG. 1, the exemplary electric power system 100 is operably connected to a controller 116. The controller 116 may be an engine controller for the engine 10 (e.g., a Full Authority Digital Engine Control controller), may be an aircraft controller, may be a controller dedicated to the electric power system 100, etc.

The controller 116 may be configured to receive data indicative of various operating conditions and parameters of the engine 10 during operation of the engine 10. For example, as will be appreciated from FIG. 1, the engine 10 includes one or more sensors 114 configured to sense data indicative of various operating conditions and parameters of the engine 10, such as rotational speeds, temperatures, pressures, vibrations, etc. For example, in the embodiment shown, the one or more sensors 114 includes a first speed sensor 114A configured to sense data indicative of a rotational speed of the rotor assembly 12; a second sensor 114B configured to sense data indicative of the high-pressure system (such as a rotational speed of high-pressure spool 38, a compressor exit temperature, etc.); a third sensor 114C configured to sense data indicative of one or combustion section parameters (such as a temperature within the combustion section 40, a fuel flow to the combustion section 40, one or more pressures within or around the combustion section 40, etc.), one or more high-pressure turbine parameters (such as turbine inlet temperature, a rotational speed of the high-pressure turbine 36, etc.), or both; a fourth sensor 114D operable to sense data indicative of one or more parameters of the low pressure system (such as a rotational speed of the low-pressure spool 55); and a fifth sensor 114E configured to sense data indicative of one or more variable geometry components (such as a position of one or more variable inlet guide vanes, outlet guide vanes, rotor blades 16, guide vanes 20, etc.).

Referring particularly to the operation of the controller 116, in at least certain embodiments, the controller 116 can include one or more computing device(s) 118. The computing device(s) 118 can include one or more processor(s) 118A and one or more memory device(s) 118B. The one or more processor(s) 118A can include any suitable processing device, such as a microprocessor, microcontroller, integrated circuit, logic device, and/or other suitable processing device. The one or more memory device(s) 118B can include one or more computer-readable media, including, but not limited to, non-transitory computer-readable media, RAM, ROM, hard drives, flash drives, and/or other memory devices.

The one or more memory device(s) 118B can store information accessible by the one or more processor(s) 118A, including computer-readable instructions 118C that can be executed by the one or more processor(s) 118A. The instructions 118C can be any set of instructions that when executed by the one or more processor(s) 118A, cause the one or more processor(s) 118A to perform operations. In some embodiments, the instructions 118C can be executed by the one or more processor(s) 118A to cause the one or more processor(s) 118A to perform operations, such as any of the operations and functions for which the controller 116 and/or the computing device(s) 118 are configured, the operations for operating an engine 10, electric power system 100, and/or hybrid electric propulsion system (e.g., method 200), as described herein, and/or any other operations or functions of the one or more computing device(s) 118. The instructions 118C can be software written in any suitable programming language or can be implemented in hardware. Additionally, and/or alternatively, the instructions 118C can be executed in logically and/or virtually separate threads on processor(s) 118A. The memory device(s) 118B can further store data 118D that can be accessed by the processor(s) 118A. For example, the data 118D can include data indicative of power flows, data indicative of engine 10/aircraft operating conditions, and/or any other data and/or information described herein.

The computing device(s) 118 can also include a network interface 118E used to communicate, for example, with the other components of the engine 10, the aircraft incorporating the engine 10, the electric power system 100, etc. For example, in the embodiment depicted, as noted above, the engine 10 includes one or more sensors 114 for sensing data indicative of one or more parameters of the engine 10 and various accessory systems, and the electric power system 100 includes an energy storage unit 104, an LP electric machine 102A, and an HP electric machine 102B. The controller 116 is operably coupled to these components through, e.g., the network interface 118E, such that the controller 116 may receive data indicative of various operating parameters sensed by the one or more sensors 114 during operation, various operating conditions of the components, etc., and further may provide commands to control electrical flow of the electric power system 100 and other operating parameters of these systems, e.g., in response to the data sensed by the one or more sensors 114 and other conditions.

The network interface 118E can include any suitable components for interfacing with one or more network(s), including for example, transmitters, receivers, ports, controllers, antennas, and/or other suitable components. For example, in the embodiment shown, the network interface 118E is configured as a wireless communication network wirelessly in communication with these components (as is indicated by the dashed communication lines in FIG. 1).

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 2:
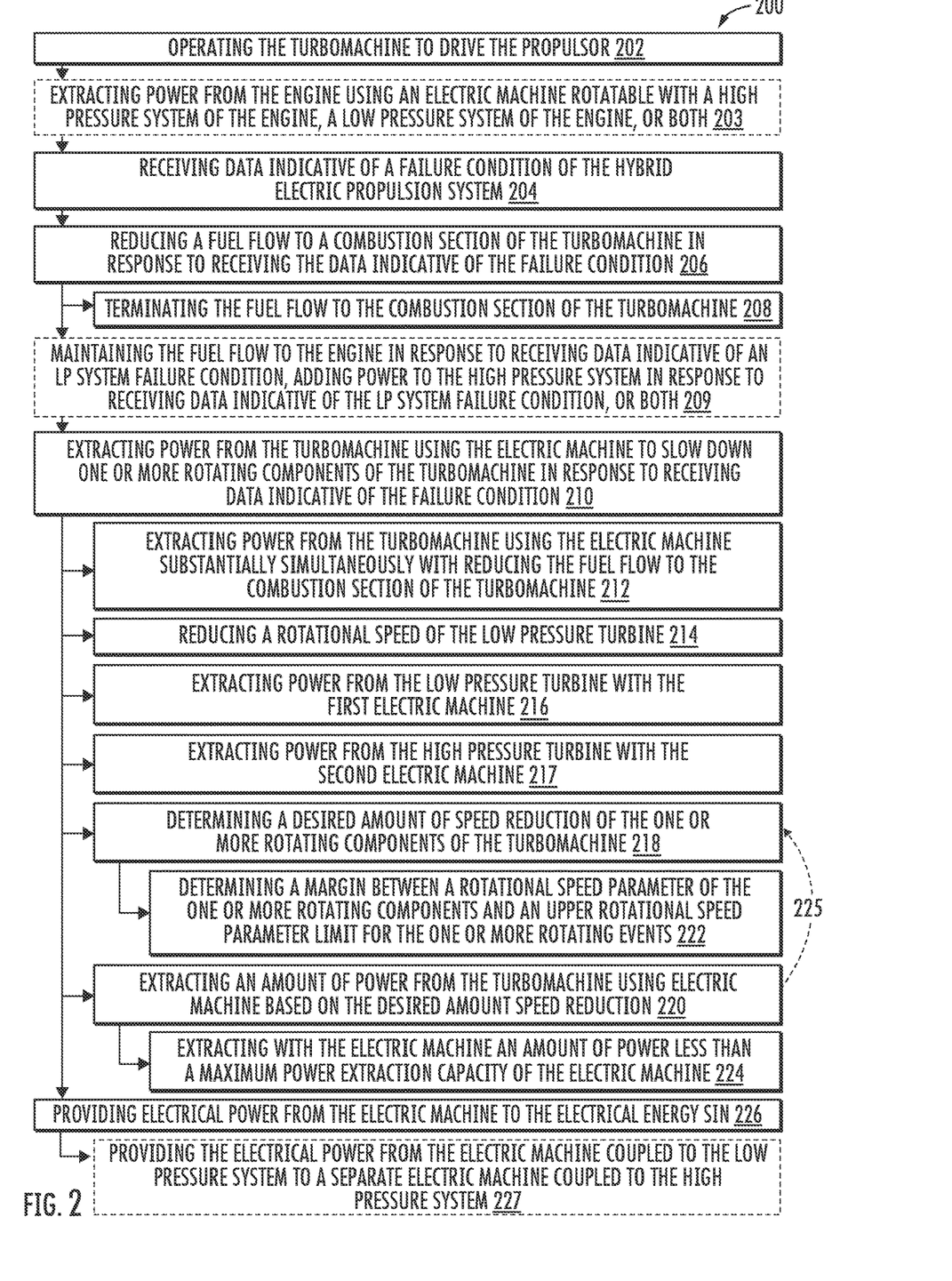
FIG. 2 is a flowchart depicting a method for operating a hybrid electric propulsion system in accordance with an exemplary aspect of the present disclosure.

Referring now to FIG. 2, a flow diagram of a method 200 for operating a hybrid electric propulsion system of an aircraft is provided. The method 200 may be utilized with one or more of the exemplary embodiments described above with reference to FIG. 1, and/or with one or more of the other exemplary embodiments described herein. For example, in at least certain exemplary aspects, the hybrid electric propulsion system may include a turbomachine, an electric machine coupled to the turbomachine, and a propulsor coupled to the turbomachine.

The method 200 includes at (202) operating the turbomachine to drive the propulsor and at (204) receiving data indicative of a failure condition of the hybrid electric propulsion system. Receiving the data at (204) may include receiving the data with a controller from one or more sensors configured to sense data indicative of one or more operating conditions and/or parameters of the turbomachine and hybrid electric propulsion system.

In certain example embodiments, the failure condition may be a shaft shear failure. In such a situation, receiving the data at (204) may include receiving data indicative of a rotational speed of an LP turbine of a low pressure system of the turbomachine being different than a rotational speed of an LP compressor of the low pressure system. Additionally, or alternatively, in such a situation, receiving the data at (204) may include receiving data indicative of one or more components at a location downstream of the combustion section exceeding acceleration and/or speed limits (e.g., data indicative of the LP turbine approaching or exceeding an upper rotational speed parameter limit, or a predetermined buffer threshold to the upper rotational speed parameter limit). The speed parameter, may be angular velocity, angular acceleration, etc. Additionally, or alternatively still, in such a situation, receiving the data at (204) may include receiving data indicative of one or more components at a location upstream of the combustion section exceeding a deceleration threshold of the one or more rotating components. Additionally, or alternatively still, in such a situation, receiving the data at (204) may include receiving data indicative of a compressor exit pressure dropping below a minimum threshold, or rapid changes in turbine clearances if turbine clearance sensing is included with the engine.

In other exemplary embodiments, the failure condition may be a fuel flow valve failure. In such a situation, receiving the data at (204) may include receiving data indicative of a difference between a selected valve position and an actual valve position, data indicative of an acceleration above an estimated amount or threshold on the low pressure system and/or on the high pressure system, data indicative of a speed of the low pressure system or high pressure system exceeding or approaching upper rotational speed parameter limits and/or a predetermined buffer threshold to the respective upper rotational speed parameter limits, or rapid changes in turbine clearances if turbine clearance sensing is included with the engine.

In still other exemplary embodiments, the failure condition may be a variable geometry component failure. In such a situation, receiving the data at (204) may include receiving data indicative of a difference between a selected position and an actual position, data indicative of an increasing acceleration above a threshold on the low pressure system and/or the high pressure system, data indicative of a speed parameter of the low pressure system or high pressure system exceeding or approaching upper rotational speed parameter limits and/or a predetermined buffer threshold to the respective upper rotational speed parameter limits, or rapid changes in turbine clearances if turbine clearance sensing is included with the engine.

In further still other exemplary embodiments, the failure condition may be any other failure affecting a rotational speed of the turbomachine. For example, the failure condition could be a gearbox failure. Additionally, or alternatively, the failure condition may be a loss of an external load condition. For example, the method 200 may include at (203) extracting power from the engine using an electric machine rotatable with a high pressure system of the engine, a low pressure system of the engine, or both. With such an exemplary aspect, the failure condition may be an unexpected or unplanned reduction in the amount of power being extracted, potentially leading to an undesirable acceleration of the engine. For example, the method 200 may include at (203) extracting at least about 10 kilowatts (kw) of power, such as at least 15 kw, such as at least 20 kw, such as at least 25 kw, such as at least 50 kw, and up to 1000 kw. The failure condition may be at least a 50% unexpected or unplanned reduction of the amount of power being extracted, such as at least a 60%, such as at least a 70%, such as at least an 80%, such as at least a 90% unexpected or unplanned reduction of the amount of power being extracted. Moreover, with such a configuration, the data received at (204) may include data indicative of the reduction of the external load, or data indicating that the reduction of the external load will likely occur.

Referring still to FIG. 2, for the exemplary aspect depicted, the method 200 includes at (206) reducing a fuel flow to a combustion section of the turbomachine in response to receiving the data indicative of the failure condition at (204). Specifically, for the exemplary aspect depicted, reducing the fuel flow to the combustion section at (206) includes it (208) terminating the fuel flow to the combustion section of the turbomachine. Additionally, reducing the fuel flow to the combustion section at (206) may include reducing the fuel flow with a fuel metering unit, a fuel shutoff valve, or a combination thereof.

More specifically, it will be appreciated that in at least certain exemplary aspects, the method 200 may reduce the fuel flow at (206) based on the type of failure condition. For example, in certain exemplary aspects, the data received at (204) may be indicative of a failure condition within or directly affecting the high pressure system (such as a HP variable guide vane failure, fuel valve failure, HP shaft sheer, etc.). With such an exemplary aspect, the method 200 may include reducing the fuel flow to the combustion section in response to receiving data indicative of the failure condition within or directly affecting the high pressure system.

However, in other exemplary aspects, the method may not reduce the fuel flow at (206). For example, in certain exemplary embodiments, the engine may include one or more overspeed safety measures that are triggered by an overspeed monitor of the high pressure system. In such a case, when the data received at (204) is indicative of a failure condition within or directly affecting the low pressure system (such as a low pressure shaft sheer, a LP variable guide vane failure, etc.), the method may want to encourage the high pressure system to accelerate to trigger the overspeed safety measures. In such a case, the method 200 may include at (209) maintaining the fuel flow to the engine in response to receiving data indicative of an LP system failure condition, adding power to the high pressure system in response to receiving data indicative of the LP system failure condition, or both. For example, the method may increase a fuel flow to the combustion section of the turbomachine in response to receiving data indicative of the LP system failure condition, may add power to an electric machine rotatable with the high pressure system, or both.

Further for the exemplary aspect depicted, the method 200 includes at (210) extracting power from the turbomachine using the electric machine to slow down one or more rotating components of the turbomachine in response to receiving data indicative of the failure condition at (204). Specifically, for the exemplary aspect depicted, extracting power from the turbomachine using the electric machine at (210) includes at (212) extracting power from the turbomachine using the electric machine substantially simultaneously with reducing the fuel flow to the combustion section of the turbomachine at (206).

It will be appreciated that, as used herein, the term "substantially simultaneously" refers to the two events occurring at least in part within a relatively small timeframe. For example, substantially simultaneously may refer to the two events occurring at least in part within a ten second window, such as within an eight second window, such as within a five second window, such as within a two second window.

Further, for the exemplary aspect depicted, it will be appreciated that the turbomachine includes a high pressure turbine and a low pressure turbine, and the electric machine and the propulsor are each coupled to the low pressure turbine. Accordingly, for this exemplary aspect of the method 200, it will be appreciated that extracting power from the turbomachine using the electric machine at (210) includes at (214) reducing a rotational speed of the low pressure turbine.

It will further be appreciated, however, that for the exemplary aspect depicted, the hybrid electric propulsion system may further include one or more additional electric machines. For example, the electric machine may be a first electric machine coupled to the low pressure turbine, and the hybrid electric propulsion system may further include a second electric machine coupled to a high pressure turbine of the high pressure system. With such an exemplary aspect, it will be appreciated that extracting power from the turbomachine using the electric machine at (210) may further include at (216) extracting power from the low pressure turbine with the first electric machine, and at (217) extracting power from the high pressure turbine with the second electric machine.

Extracting power from the high pressure system at (217) may create a drag on the high pressure system and may therefore assist with reducing a chance of the low pressure turbine over-speeding.

Notably, for exemplary aspects having first and second electric machines coupled to the low and high pressure turbines, it may be beneficial to vary a ratio of the amount of electric power extracted from the low pressure system/low pressure turbine to the amount of electric power extracted from the high pressure system/high pressure turbine. For example, in certain exemplary aspects, receiving data indicative of the failure condition at (204) may include receiving data indicative of the type of failure condition, the extent of the failure condition, or both, and extracting power from the turbomachine using the electric machine at (210) may include varying a ratio of the amount power extracted from the low pressure system using the first electric machine to the amount of power extracted from the high pressure system using the second electric machine based at least in part on the type of failure condition, the extent of the failure condition, or both.

Additionally, or alternatively, the method 200 may include varying the ratio power extracted from the low pressure system to the high pressure system based on other data received at (204). For example, in certain example aspects, the method 200 may include varying the ratio of the amount of power extracted from the low pressure system to of the amount of power extracted from the high pressure system based on one or more of a rotational speed parameter of the high pressure turbine, a rotational speed parameter of the low pressure turbine, a margin of the rotational speed parameter of the high pressure turbine to the upper rotational speed parameter limit for the high pressure turbine, a margin of the rotational speed parameter of the low pressure turbine to the upper rotational speed parameter of the low pressure turbine, etc.

It will be appreciated, however, that the above exemplary aspect is provided by way of example only, and in other exemplary aspects, the method 200 may only include extracting electrical power from a single electric machine.

Referring still to the exemplary method 200 depicted in FIG. 2, it will be appreciated that in certain failure conditions (and based on the extent of the failure), it may not be necessary to apply full speed reduction measures. For example, in the event the failure condition is a variable geometry failure condition, it may not be necessary to completely terminate fuel flow to the combustion section of the gas turbine engine and also to extract the maximum amount of power from, e.g., the low pressure system, using the electric machine.

Accordingly, referring still to FIG. 2, for the exemplary aspect of the method 200 depicted, extracting power from the turbomachine at (210) further includes at (218) determining a desired amount of speed reduction of the one or more rotating components of the turbomachine, and at (220) extracting an amount of power from the turbomachine using electric machine based on the desired amount speed reduction.

In certain exemplary aspects, determining the desired amount of speed reduction of the one or more rotating components of the turbomachine at (218) includes at (222) determining a margin between a rotational speed parameter of the one or more rotating components and an upper rotational speed parameter limit for the one or more rotating events. For example, in certain exemplary embodiments, the rotational speed parameter may be rotational speed, rotational acceleration, or combination thereof.

In further exemplary aspects, extracting the amount of power from the turbomachine using the electric machine based on the determined desired amount speed reduction at (220) may include at (224) extracting with the electric machine an amount of power less than a maximum power extraction capacity of the electric machine. For example, extracting with the electric machine the amount of power less than the maximum power extraction capacity of the electric machine at (224) may include extracting with the electric machine an amount of power equal to 90% or less of the maximum power extraction capacity of the electric machine, such as equal to 80% or less of the maximum power extraction capacity of the electric machine, such as equal to 70% or less of the maximum power extraction capacity of the electric machine, and the least about 15% of the maximum power extraction capacity of the electric machine.

Further, still, in such a configuration, extracting power from the turbomachine at (210) may be controlled as a feedback loop. In particular, it will be appreciated that in at least certain exemplary aspects, determining the desired amount of speed reduction of the one or more components at (218) may include continuously determining the desired amount speed reduction of the one or more components, and extracting the amount of power from the turbomachine using the electric machine at (220) may include modifying the amount of power extracted from the turbomachine using the electric machine based on updated determined desired amounts of speed reduction of the one or more rotating components of the turbomachine. Such is depicted by arrow 225 in FIG. 2.

In each of the above exemplary aspects, it will be appreciated that the hybrid electric propulsion system further includes an electrical energy sink. The electrical energy sink may be one or more of an electric energy storage unit, an electrical energy resistance bank, an aircraft electrical bus, one or more electric machines coupled to other engines of the aircraft, etc. In such a case, it will be appreciated that the method 200 further includes at (226) providing electrical power from the electric machine to the electrical energy sink.

Further, in certain exemplary aspects, the energy sink may not be an energy sink external to the engine. For example, when the failure condition is a low pressure failure, the energy sink may be the high pressure system (or rather an electric machine coupled to the high pressure system). With such a configuration, providing electrical power from the electric machine to the electrical energy sink at (226) may include at (227) providing the electrical power from the electric machine coupled to the low pressure system to a separate electric machine coupled to the high pressure system.

Operating a hybrid electric propulsion system in accordance with the present disclosure may allow for the one or more electric machines to effectively reduce a terminal velocity reached by the low pressure system and/or high pressure system during a failure condition of the engine. In such a manner, it will be appreciated that certain components of the engine may be redesigned to instead withstand the lower terminal velocity of such components. For example, with respect to the low pressure turbine, various rotor discs included therein may be designed to be smaller and lighter by virtue of the design goal of being capable of withstanding a lower terminal velocity in the event of a failure condition. Such may result in a lighter, more cost-effective, and more fuel-efficient engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further embodiments of the present disclosure may be disclosed in the following clauses:

A method for operating a hybrid electric propulsion system of an aircraft, the hybrid electric propulsion system comprising a turbomachine, an electric machine coupled to the turbomachine, and a propulsor coupled to the turbomachine, the method comprising: operating the turbomachine to drive the propulsor; receiving data indicative of a failure condition of the hybrid electric propulsion system; and extracting power from the turbomachine using the electric machine to slow down one or more rotating components of the turbomachine in response to receiving the data indicative of the failure condition.

The method of one or more of these clauses, wherein extracting power from the turbomachine using the electric machine to slow down one or more rotating components of the turbomachine comprises: determining a desired amount of speed reduction of the one or more rotating components of the turbomachine; and extracting an amount of power from the turbomachine using the electric machine based on the determined desired amount of speed reduction.

The method of one or more of these clauses, wherein extracting the amount of power from the turbomachine using the electric machine based on the determined desired amount of speed reduction comprises extracting an amount of power less than a maximum power extraction capacity of the electric machine.

The method of one or more of these clauses, wherein extracting the amount of power from the turbomachine using the electric machine based on the determined desired amount of speed reduction comprises extracting an amount of power less than 80% of a maximum power extraction capacity of the electric machine.

The method of one or more of these clauses, wherein the turbomachine comprises a high pressure turbine and a low pressure turbine, wherein the electric machine and the propulsor are each coupled to the low pressure turbine, and wherein the one or more rotating components comprise the low pressure turbine.

The method of one or more of these clauses, wherein determining the desired amount of speed reduction of the one or more rotating components of the turbomachine comprises determining a margin between a rotational speed parameter of the one or more rotating components and an upper rotational speed parameter limit for the one or more rotating components.

The method of one or more of these clauses, wherein the electric machine is a first electric machine, wherein the turbomachine comprises a high pressure turbine and a low pressure turbine, wherein the first electric machine and the propulsor are each coupled to the low pressure turbine, and wherein the hybrid electric propulsor system further comprises a second electric machine coupled to the high pressure turbine.

The method of one or more of these clauses, wherein extracting power from the turbomachine using the electric machine to slow down one or more rotating components of the turbomachine in response to receiving the data indicative of the failure condition comprises: extracting power from the low pressure turbine with the first electric machine; and extracting power from the high pressure turbine with the second electric machine.

The method of one or more of these clauses, wherein the failure condition is a shaft shear failure.

The method of one or more of these clauses, wherein the failure condition is a fuel flow valve failure.

The method of one or more of these clauses, wherein the failure condition is a variable geometry component failure.

The method of one or more of these clauses, wherein the data indicative of the failure condition is data indicative of a rotational speed of the low pressure turbine exceeding an upper rotational speed limit.

The method of one or more of these clauses, wherein the turbomachine comprises a high pressure turbine and a low pressure turbine, wherein the electric machine and the propulsor are each coupled to the low pressure turbine.

The method of one or more of these clauses, wherein extracting power from the turbomachine using the electric machine to slow down one or more rotating components of the turbomachine comprises reducing a rotational speed of the low pressure turbine.

The method of one or more of these clauses, wherein extracting power from the turbomachine using the electric machine comprises extracting power from the turbomachine using the electric machine substantially simultaneously with reducing the fuel flow to the combustion section of the turbomachine.

The method of one or more of these clauses, wherein the electric machine is located inward of a core air flowpath of the turbomachine along a radial direction of the turbomachine.

The method of one or more of these clauses, wherein the electric machine is located outward of a core air flowpath of the turbomachine along a radial direction of the turbomachine.

The method of one or more of these clauses, wherein extracting power from the turbomachine using the electric machine comprises extracting at least about twenty kilowatts of electrical power with the electric machine.

The method of one or more of these clauses, wherein the hybrid electric propulsion system further comprises an electric energy sink, and wherein extracting power from the turbomachine using the electric machine comprises providing electrical power from the electric machine to the electric energy sink.

The method of one or more of these clauses, wherein the electric energy sink is configured to store at least about twenty kilowatt-hours of electrical power.

The method of one or more of these clauses, wherein the electric energy sink comprises an energy storage unit, an electrical resistance bank, or both.

The method of one or more of these clauses, wherein reducing the fuel flow to the combustion section of the turbomachine comprises terminating the fuel flow to the combustion section of the turbomachine.

The method of one or more of these clauses, wherein extracting power from the turbomachine using the electric machine to slow down one or more rotating components of the turbomachine in response to receiving the data indicative of the failure condition comprises extracting power from the low pressure turbine with the first electric machine, and the method further comprises: providing power to the high pressure turbine with the second electric machine.

The method of one or more of these clauses, wherein receiving data indicative of a failure condition comprises receiving data indicative of a low pressure system failure condition.

The method of one or more of these clauses, wherein the failure condition is at least one of a shaft shear failure, a fuel flow valve failure, a variable geometry component failure, or a loss of load condition.

The method of one or more of these clauses, further comprising: reducing a fuel flow to a combustion section of the turbomachine in response to receiving the data indicative of the failure condition.

The method of one or more of these clauses, wherein reducing the fuel flow to the combustion section of the turbomachine comprises terminating the fuel flow to the combustion section of the turbomachine.

The method of one or more of these clauses, wherein extracting power from the turbomachine using the electric machine comprises extracting power from the turbomachine using the electric machine substantially simultaneously with reducing the fuel flow to the combustion section of the turbomachine.

A hybrid electric propulsion system for an aircraft comprising: a turbomachine comprising a combustion section; a propulsor coupled to the turbomachine; an electric machine also coupled to the turbomachine; and a controller configured to receive data indicative of a failure condition of the hybrid electric propulsion system during operation of the turbomachine and, in response, extract power from the turbomachine using the electric machine.

The hybrid electric propulsion system of one or more of these clauses, wherein in extracting power from the turbomachine using the electric machine, the controller is further configured to: determine a desired amount of speed reduction of the one or more rotating components of the turbomachine; and extract an amount of power from the turbomachine using the electric machine based on the determined desired amount of speed reduction.

The hybrid electric propulsion system of one or more of these clauses, wherein the turbomachine comprises a high pressure turbine and a low pressure turbine, wherein the electric machine and the propulsor are each coupled to the low pressure turbine.

What is claimed is:

1. A method for operating a hybrid electric propulsion system of an aircraft, the hybrid electric propulsion system comprising a turbomachine, an electric machine coupled to the turbomachine, and a propulsor coupled to the turbomachine, the method comprising:
   operating the turbomachine to drive the propulsor;
   receiving data indicative of a failure condition of the hybrid electric propulsion system; and
   extracting power from the turbomachine using the electric machine to slow down one or more rotating components of the turbomachine in response to receiving the data indicative of the failure condition, wherein the electric machine is a first electric machine, wherein the turbomachine comprises a high pressure turbine and a low pressure turbine, wherein the first electric machine and the propulsor are each coupled to the low pressure turbine, wherein extracting power from the turbomachine comprises extracting power from the low pressure turbine with the first electric machine; and
   adding power to the high pressure turbine to increase a speed of the high pressure turbine in response to receiving the data indicative of the failure condition.

2. The method of claim 1, wherein extracting power from the turbomachine using the electric machine to slow down one or more rotating components of the turbomachine comprises:
   determining a desired amount of speed reduction of the one or more rotating components of the turbomachine; and
   extracting an amount of power from the turbomachine using the electric machine based on the determined desired amount of speed reduction.

3. The method of claim 2, wherein extracting the amount of power from the turbomachine using the electric machine based on the determined desired amount of speed reduction comprises extracting an amount of power less than a maximum power extraction capacity of the electric machine.

4. The method of claim 2, wherein extracting the amount of power from the turbomachine using the electric machine based on the determined desired amount of speed reduction comprises extracting an amount of power less than 80% of a maximum power extraction capacity of the electric machine.

5. The method of claim 2, wherein the electric machine and the propulsor are each coupled to the low pressure turbine, and wherein the one or more rotating components comprise the low pressure turbine.

6. The method of claim 2, wherein determining the desired amount of speed reduction of the one or more rotating components of the turbomachine comprises determining a margin between a rotational speed parameter of the one or more rotating components and an upper rotational speed parameter limit for the one or more rotating components.

7. The method of claim 1, wherein the hybrid electric propulsor system further comprises a second electric machine coupled to the high pressure turbine.

8. The method of claim 7, wherein adding power to the high pressure turbine to increase a speed of the high pressure turbine comprises:
   providing power to the high pressure turbine with the second electric machine.

9. The method of claim 8, wherein receiving data indicative of a failure condition comprises receiving data indicative of a low pressure system failure condition.

10. The method of claim 1, wherein the failure condition is at least one of a shaft shear failure, a fuel flow valve failure, a variable geometry component failure, or a loss of load condition.

11. The method of claim 1, wherein the turbomachine comprises a high pressure turbine and a low pressure turbine, wherein the electric machine and the propulsor are each coupled to the low pressure turbine.

12. The method of claim 1, wherein extracting power from the turbomachine using the electric machine comprises extracting at least about twenty kilowatts of electrical power with the electric machine.

13. The method of claim 1, wherein the hybrid electric propulsion system further comprises an electric energy sink, and wherein extracting power from the turbomachine using the electric machine comprises providing electrical power from the electric machine to the electric energy sink.

14. The method of claim 13, wherein the electric energy sink comprises an energy storage unit, an electrical resistance bank, or both.

15. The method of claim 1, wherein adding power to the high pressure turbine to increase a speed of the high pressure turbine comprises:
  increasing a fuel flow to a combustion section of the turbomachine in response to receiving the data indicative of the failure condition.

16. A hybrid electric propulsion system for an aircraft comprising:
  a turbomachine comprising a combustion section, a high pressure turbine, and a low pressure turbine;
  a propulsor coupled to the turbomachine;
  an electric machine also coupled to the turbomachine, wherein the electric machine is a first electric machine, wherein the first electric machine and the propulsor are each coupled to the low pressure turbine; and
  a controller configured to receive data indicative of a failure condition of the hybrid electric propulsion system during operation of the turbomachine and, in response, extract power from the low pressure turbine of the turbomachine using the first electric machine;
  wherein controller is further configured to add power to the high pressure turbine to increase a speed of the high pressure turbine in response to receiving data indicative of the failure condition.

17. The hybrid electric propulsion system of claim 16, wherein in extracting power from the turbomachine using the electric machine, the controller is further configured to:
  determine a desired amount of speed reduction of the one or more rotating components of the turbomachine, and extract an amount of power from the turbomachine using the electric machine based on the determined desired amount of speed reduction.

* * * * *